T. B. JENKINS.
VEHICLE SPRING.
APPLICATION FILED NOV. 24, 1915.
1,180,043.
Patented Apr. 18, 1916.
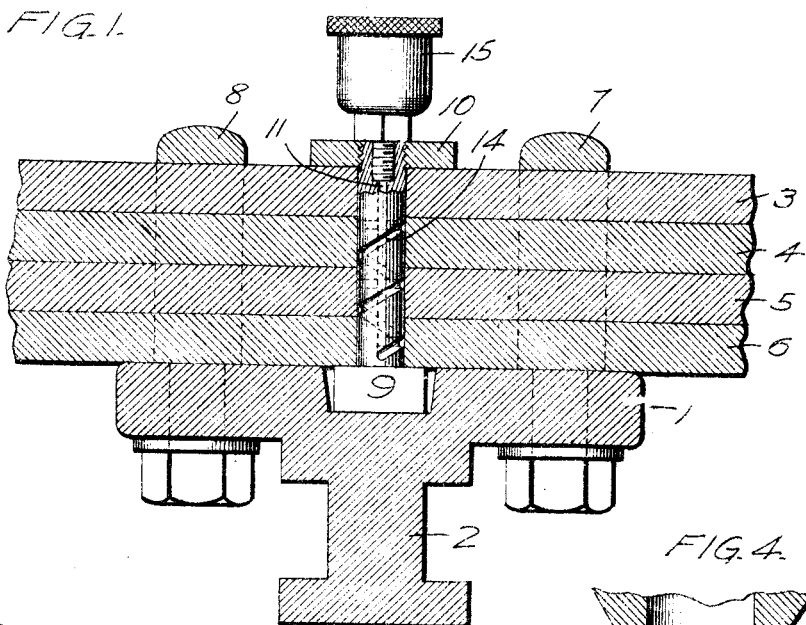
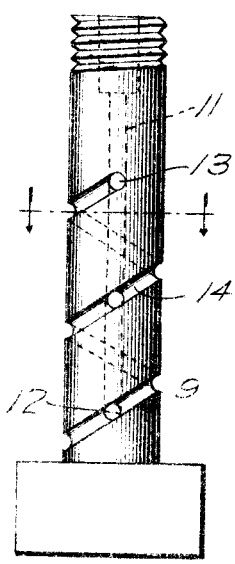
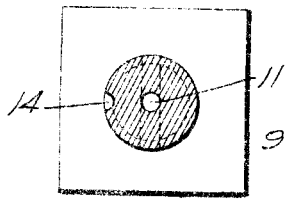
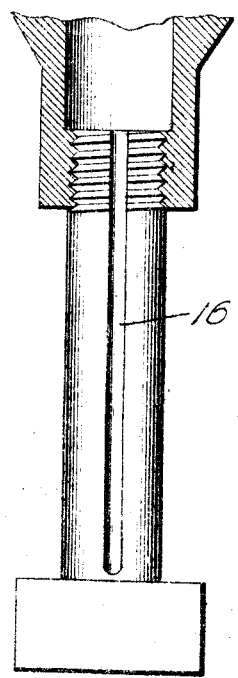
Inventor
Thomas Bracey Jenkins,
Witness
By
H. R. Van Deventer,
Attorney

UNITED STATES PATENT OFFICE.

THOMAS BRACEY JENKINS, OF SUMTER, SOUTH CAROLINA.

VEHICLE-SPRING.

1,180,043.   Specification of Letters Patent.   Patented Apr. 18, 1916.

Application filed November 24, 1915. Serial No. 63,217.

*To all whom it may concern:*

Be it known that I, THOMAS BRACEY JENKINS, a citizen of the United States, residing at Sumter, in the county of Sumter and State of South Carolina, have invented certain new and useful Improvements in Vehicle-Springs, of which the following is a specification, reference being had to the accompanying drawing.

This invention relates to means for lubricating vehicle springs and comprises a bolt, having grooves whereby lubricant may be applied to the various layers of the spring.

A further object is to provide a bolt of such a form that it may be readily used in any standard spring, no special arrangement or construction of the spring leaves being necessary.

In the accompanying drawings, Figure 1 is a side view part in section, of a spring embodying my invention. Fig. 2 is a bolt, as shown at Fig. 1. Fig. 3 a sectional view of the bolt shown at Fig. 2, and Fig. 4, an alternate form of bolt.

Like figures of reference denote the same parts wherever they are shown.

1 denotes the usual spring perch which may be integral with the vehicle axle 2, or it may be attached thereto.

The spring proper consists of the leaves, 3, 4, 5, and 6, which are clamped to the perch by means of the ordinary spring clips, 7 and 8. The bolt 9 passing through the center of the spring leaves, clamps them together, when nut 10 is in place. In 9 is drilled a hole 11, connecting with the lateral apertures, 12 and 13, which communicate with the outer spiral groove 14 In the top of the bolt is screwed a grease cup 15, the vent of which communicates with the center hole 11. It will now be seen that oil or grease from the cup 15 will pass down the opening 11 and issue from the vents 12 and 13 into the groove 14, and from said groove will work into and between the various layers of the spring, thereby lubricating the same.

An alternate form of bolt is shown at Fig. 4, having two longitudinal grooves, one of which is shown at 16. These grooves are made on the outside of the bolt. The grease cup 15 has a female thread as shown, and serves to clamp the bolt in place, thereby dispensing with the nut 10, which is otherwise used. In this arrangement the bolt is not weakened by the center hole 11.

It will be obvious from the foregoing description that the necessity for spring leaves of any special construction having grooves or other means registering with the grease vents in the bolt is eliminated, as I find that the grease readily penetrates between the layers of the spring, when the same is of the ordinary and well known construction, and it will also be observed that the special bolt constituting my invention, may be applied to the ordinary type of springs now in use.

Having thus described my invention, I claim:

1. In a vehicle spring, a hollow bolt, having one or more lateral apertures, an oil groove on the outer surface of said bolt connecting said apertures, and means for supplying a lubricant to said bolt substantially as described.

2. A vehicle spring comprising a plurality of flat leaves, having plain surfaces, a center bolt securing said leaves together, and having an internal oil duct and an external oil groove and having means for connecting said groove and duct, and means for supplying lubricant to said duct, substantially as described.

3. A vehicle spring comprising a plurality of flat leaves, a center bolt securing said leaves together, and having an internal oil duct and an external oil groove, and having means for connecting said groove and duct, and means for supplying lubricant to said duct, substantially as described.

In testimony whereof I hereunto affix my signature.

THOMAS BRACEY JENKINS.